United States Patent [19]

Haley et al.

[11] Patent Number: 5,044,720
[45] Date of Patent: Sep. 3, 1991

[54] ACTIVE DEVICE MOUNT WITH MARK PREVENTION AND METHOD OF MAKING SAME

[75] Inventors: Edmund J. Haley, Dillsburg; Robert L. Mansberger, II, Middletown; Robert N. Weber, Hummelstown, all of Pa.

[73] Assignee: AMP Incorporated, Harrisburg, Pa.

[21] Appl. No.: 624,854

[22] Filed: Dec. 10, 1990

[51] Int. Cl.⁵ ............................ G02B 6/26; H01J 5/16; B29D 11/00
[52] U.S. Cl. ................. 385/88; 250/227.11; 264/1.5; 264/328.1
[58] Field of Search ............ 350/96.20, 96.21, 96.22, 350/320; 250/227.11; 264/1.5, 1.6, 1, 2.3, 328.1

[56] References Cited

U.S. PATENT DOCUMENTS

| | | | |
|---|---|---|---|
| 4,118,105 | 10/1978 | Voigt | 350/96.20 |
| 4,173,389 | 11/1979 | Curtis | 350/96.20 |
| 4,186,995 | 2/1980 | Schumacher | 350/96.20 |
| 4,377,322 | 3/1983 | Ransley et al. | 350/96.20 |
| 4,433,898 | 2/1984 | Nasiri | 350/96.20 |
| 4,461,539 | 7/1984 | Bailey et al. | 350/96.21 |
| 4,515,432 | 5/1985 | Sherwin | 350/96.20 |
| 4,767,178 | 8/1988 | Sasaki et al. | 350/96.20 |
| 4,814,118 | 3/1989 | Plummer et al. | 264/2.2 |
| 4,834,487 | 5/1989 | Abendschein et al. | 350/96.20 |
| 4,848,866 | 7/1989 | Feulner et al. | 350/96.20 |
| 4,907,852 | 3/1990 | Noba et al. | 350/96.20 |
| 4,934,960 | 6/1990 | Capp et al. | 439/620 |
| 4,979,791 | 12/1990 | Bowen et al. | 350/96.17 |

Primary Examiner—Brian Healy
Attorney, Agent, or Firm—Gerald K. Kita

[57] ABSTRACT

An active device mount 1, comprises, a body 2 for receiving an optoelectronic device 10 and having a socket 11 for receiving a holder 15 for an optical fiber, an interior and an entrance end of the socket 11 being covered with a material 16 molded with a lip 17 projecting from the entrance end, the lip 17 having exterior mold vestiges 54, and the material 16 preventing a rubbing mark from being applied on the holder 15 by the socket 11.

10 Claims, 3 Drawing Sheets

ACTIVE DEVICE MOUNT WITH MARK PREVENTION AND METHOD OF MAKING SAME

FIELD OF THE INVENTION

The invention relates to an active device mount for receiving and aligning an optoelectronic device and a holder for an optical fiber.

BACKGROUND OF THE INVENTION

U.S. Patent of application Ser. No. 448,043 filed Dec. 8, 1989, now U.S. Pat. No. 4,979,791, discloses an active device mount having a socket for receiving a holder for an optical fiber to be aligned with an active device, known also as an optoelectronic device, mounted in the holder. The holder is comprised of a ceramic, for example, alumina, having a light coloration. Ceramics are a class of materials useful for small precision parts requiring precise dimensions that do not vary appreciably with changes in temperature. Further, ceramics are generally hard substances, and are too hard for shaping by machining tools in widespread industrial use. Manufacturing operations for ceramic precision parts remain highly specialized and expensive, elevating the cost of such parts.

On the other hand, the active device mount can be constructed without unnecessary elevated cost by using materials more susceptible than are ceramics to being shaped by the manufacturing operations widely practiced. For example, stainless steel, a material of less exceptional properties than ceramics, is readily shaped by machining operations to provide a socket with adequate dimensional precision. One disadvantage is observed when the stainless steel has been in rubbing contact with a ceramic, particularly a ceramic of light coloration and inherent abrasiveness. Stainless steel does not itself become visibly marred by an unsightly stain of its own oxide. Yet stainless steel is capable of applying marks by rubbing upon lighter coloration ceramics. The stainless steel of the socket applies visible dark stains or marks upon the ceramic holder whenever the ceramic holder rubs against the socket during its insertion and withdrawal.

SUMMARY OF THE INVENTION

The invention is developed in response to a need for eliminating unsightly marks applied by sockets fabricated from easily shaped metals onto light colored holders for optical fibers. A feature of the invention resides in an interior and an entrance end of the socket being covered with material preventing a rubbing mark from being applied on the holder by the socket. The material is fabricated by molding a polymer material of sufficient rigidity to resist deformation by receipt of the holder in the socket. Molding as a manufacturing process, is widely practiced.

Another feature of the invention resides in the material being molded with a lip projecting from the entrance end, the lip having exterior mold vestiges, the material covering the interior being devoid of mold vestiges. A molding operation will impart mold vestiges on the surface of the material shaped by the molding operation. The vestiges not only are surface imperfections, and further circumvent dimensional precision of the surface on which they appear. According to the invention, mold vestiges appear only at the molded material forming an exterior of a lip on the socket, the exterior having no requirement for dimensional precision. Further according to the invention, precise interior dimensions of the molded part for aligning the ceramic holder in the socket are achieved by an absence of mold vestiges on the interior surface of the molded part.

U.S. Pat. No. 4,934,960 discloses an electrical connector having insulative polymer material molded in a conductive metal socket. The polymer material provides a mass of electrical insulation and lacks a surface of precise dimensions for precision alignment of a holder of an optical fiber. An optical connector, disclosed in U.S. Pat. No. 4,834,487, in which a unitary alignment ferrule is molded of plastic material, is disclosed with a discussion pertaining to locating mold flash where precise dimensional accuracy is not required.

For an understanding of the invention, reference will now be made by way of example to the following detailed description taken in conjunction with accompanying drawings.

DETAILED DESCRIPTION

Figure 1:
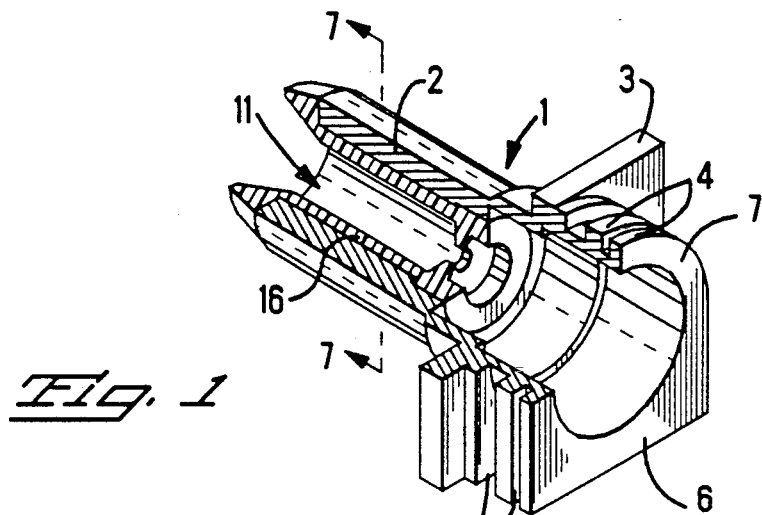
FIG. 1 is a perspective view partially cut away of an active device mount.
Figure 2:
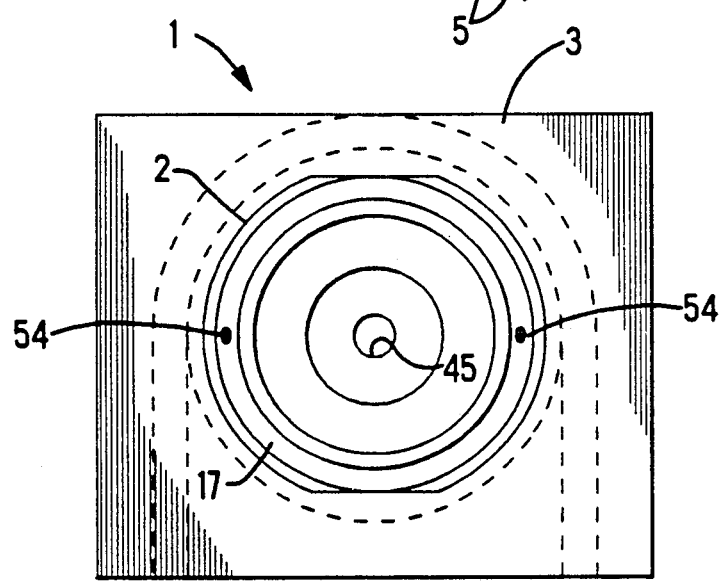
FIG. 2 is an enlarged end view of the active device mount shown in FIG. 1.
Figure 3:
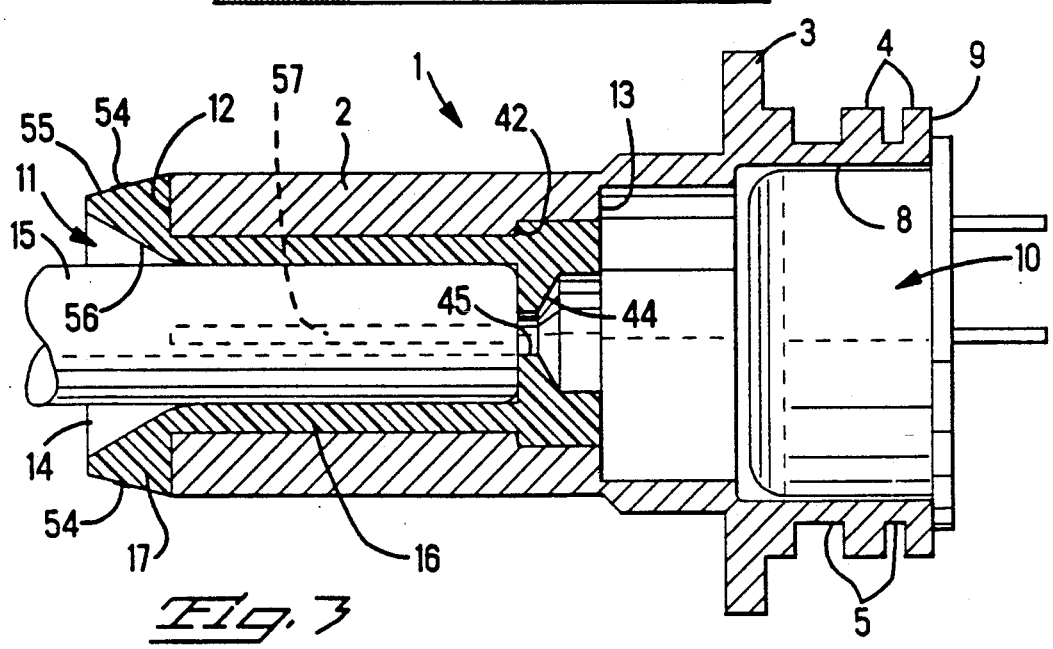
FIG. 3 is an enlarged elevation view in section of the active device mount shown in FIG. 1.

With more particular reference to FIGS. 1, 2 and 3, an active device mount 1 comprises a body 2 having a series of exterior flanges 3, 4 spaced apart by grooves 5 of different widths. The forward flange 3, the largest, is rectangular. The remaining smaller flanges 4 have corresponding rectangular portions 6 unitary with semicircular portions 7. Each of the grooves 5 follows the shape of the edges of the portions 6 and 7 of the smaller flanges 4. As shown, the body 2 is unitary. However, the body can be assembled from multiple parts, for example, as disclosed in the above referred to, U.S. Patent.

A stepped passage 8 through the body 2 communicates with a rear end 9 of the body 2 for receiving a known optoelectronic device 10, for example, a semiconductor architecturally configured as a laser, or a light emitting diode, or a light receiving diode, together with associated electronics in an electronic package. The appearance of the optoelectronic device 10 is disclosed in the U.S. Patent disclosed above.

A socket 11 at a front, entrance end 12 of the active device mount 1 communicates with the passage 9. The socket 11 has a step 13, FIG. 3, in its diameter facing rearward in the interior of the active device mount 1. An open entrance 14 of the socket 11 is for receiving a holder 15 for an optical fiber, the holder 15 being of the type disclosed in the U.S. Patent referred to above. The socket 11 of the active device mount 1 permits insertion and withdrawal of the holder 15 with respect to the optoelectronic device 10. The active device mount 1 operates to align the holder 15, and the optical fiber, in precise alignment with the optoelectronic device 10. Although precision is required, dimensional precision of the socket 11 is achieved by machining the socket 11 from stainless steel. Machining stainless steel is a widely practiced manufacturing technique. Thus, the active device mount 1 can be manufactured without unnecessary elevated cost by using materials more susceptible than are ceramics to being shaped by machining. One disadvantage has been seen when the stainless steel has been in rubbing contact with a ceramic, particularly a ceramic of light coloration. Stainless steel does not itself become visibly marred by an unsightly stain of its own oxide. Yet stainless steel is capable of applying marks by rubbing upon objects made of abrasive ceramic materials of lighter coloration. The stainless steel of the socket 11 applies visible dark stains or marks upon the ceramic holder 15 of lighter coloration whenever the ceramic holder 15 rubs against the socket 11 during its insertion and withdrawal.

According to the invention, a material 16 covers the socket 11 interior and the entrance end 12 of stainless steel. The material 16 is molded with a lip 17 projecting from the entrance end 12 of stainless steel. The material 16 prevents a rubbing mark, or stain, from being applied on the holder 15 by the stainless steel. The material 16 is sufficiently rigid to resist deformation when engaged by the holder 15. Deformation would be detrimental to a requirement that the socket 11 resist movement of the holder 15 from a position of precise alignment in the socket 11. One material 16 that is suitable, is a polymer, polyethersulphone, PES, having a behavior at room temperature as that of a traditional engineering thermoplastic, tough, rigid, and strong, and possessing outstanding long term, load bearing properties. A suitable brand "Victrex" PES and injection molding processing information are available from ICI Advanced Materials, Wilmington, Del. 19897. Telephone 1-800-VICTREX.

Figure 4:
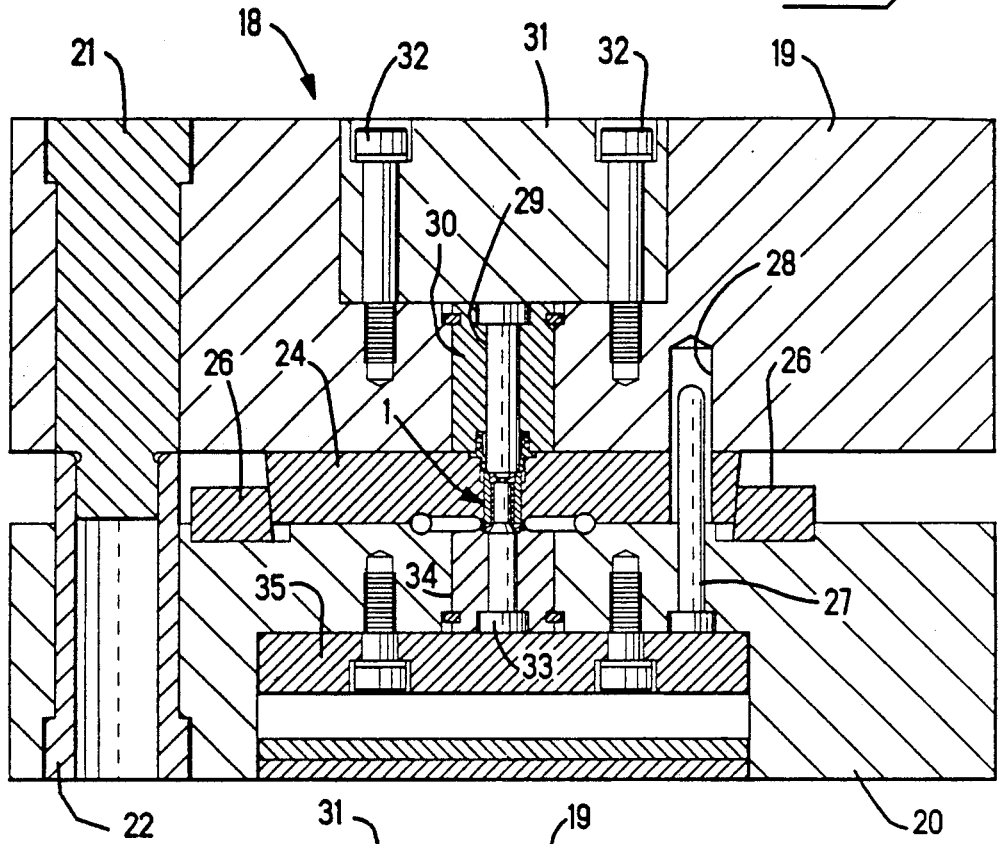
FIG. 4 is an elevation view in section of a portion of an apparatus for molding.
Figure 5:
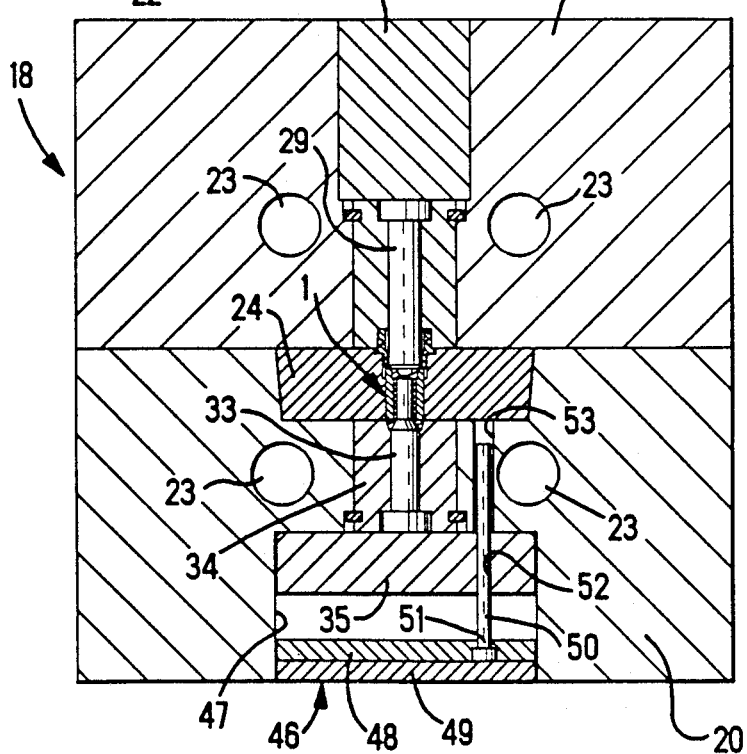
FIG. 5 is an enlarged view of a portion of the apparatus shown in FIG. 4.
Figure 6:
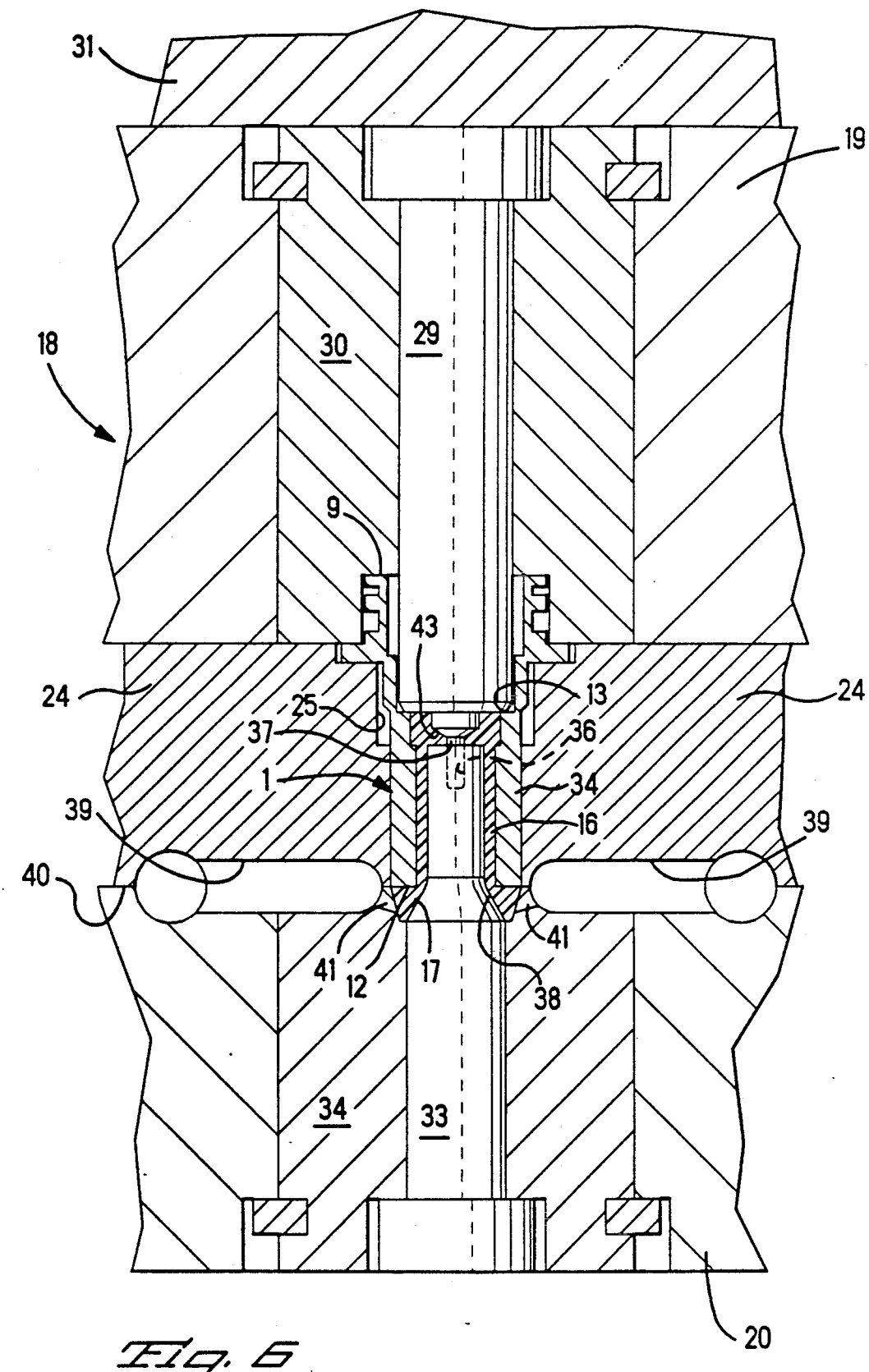
FIG. 6 is an enlarged fragmentary view of a portion of the apparatus shown in FIG. 5.

With reference to FIGS. 4, 5 and 6, molding apparatus 18 comprises a first "A" side molding die 19 and a second "B" side molding die 20. The dies 19, 20 are moved together and apart in the molding apparatus 18, in a known manner of operation. In FIG. 4 is shown a guide pin 21 in the "A" side die 19 aligned for receipt in a corresponding guide bushing 22 in the "B" side die 20. Cartridge heaters, not shown, are mounted in openings 23, FIG. 5.

Between the dies 19, 20 is a hand insert 24, a machined block, with a cavity 25, FIG. 6, to hold, and to close against, the exterior of the active device mount 1 that is removably set in the cavity 25. End blocks 26, FIG. 4, are inset in the "B" side die 20 and position the hand insert 24. FIG. 4 shows a guide pin 27, for the hand insert 24, in the "B" side die 20 and passing through the hand insert 24 and received in a corresponding recess 28 in the first die.

An "A" side core pin 29 is mounted in a core pin retainer 30, in turn, mounted in the "A" side die 19. A first backup plate 31 is secured by bolts 32 to the "A" side die, and holds the core pin 29 and retainer 30. The "A" side core pin 29 enters the open rear end 9 of the active device mount 1 and closes against the step 13 in the diameter.

A "B" side core pin 33 is mounted in a core pin retainer 34, in turn, mounted in the "B" side die 20. A backup plate 35 is secured by bolts to the "B" side die 20 and holds the "B" side core pin 33 and retainer 34. The core pin 33 enters the socket 11 of the active device mount 1. In a front end of the "B" side core pin 33 is a pilot hole 36, FIG. 6. The "A" side core pin 29 has a reduced tip 37 that is tightly received in the pilot hole 36. Thereby, the core pins 29, 33 close against each other. The pilot hole 36 also receives gasses displaced during the molding operation.

The "B" side core pin 33 is concentric within the active device mount 1. A mold cavity 38 is formed in a space near the entrance end 12 of the socket 11, encircling around the "B" side core pin 33. Molten polymer material 16 is introduced through runners 39, FIG. 6, extending at a parting line 40 between the hand insert and the "B" side die. The runners connect with tunnel gates 41 that communicate with the mold cavity 38 to introduce molten polymer material 16 over the core pins 29, 33 and to cover the entrance end 12, and to cover the interior of the socket 11. Molten material 16 forms in a space between the "B" side core pin 33 and the body 2, and forms in the mold cavity 38 to form the lip 17 covering the open end of the socket 11. The material 16 is molded with the lip 17 projecting from the entrance end 12.

The material 16 conforms to the surface of the entrance end 12 to resist movement in a rearward direction. The material 16 conforms to the surface of an interior step 42, FIG. 3, in the diameter of the body 2 to resist movement in a forward direction. Thus, the interior step 42 and the entrance end 12 provide spaced apart shoulders of the body 2. The material 16 is restrained from movement by extending continuously between the shoulders, and by conforming to the shoulders.

Further, the material 16 forms against a conical portion frustrum 43 of the "A" side core pin 29 to form an interior bulkhead 44 within the body 2 that braces the material 16 at the interior step 42. An aperture 45 in the bulkhead 44 is formed by the tip 37 of the "A" side core pin 29. Thus, molten material 16 forms around the core pins 29, 33 with the core pins 29, 33 engaged to form an aperture 45 through the material 16.

With reference to FIG. 5, an ejector plate 46 reciprocates in a space 47 in the "B" side die, and includes a retainer plate 48 and an ejector backup plate 49. One of a number of ejector pins 50 is mounted in a corresponding guide 51 passing through the retainer plate 49. The ejector backup plate 49 engages enlarged heads of the ejector pin 50 to hold the pin 50 in the retainer plate 48. The pin 50 extends through a corresponding guide passage 52 through the "B" side backup plate 35 and along ejector pin cavities 53 in the "B" side die 20, to engage the hand insert 24. After the molten material 16 is solidified, the dies 29, 33 open, by moving apart, not shown. The ejector plate 46 is reciprocated in the space 47, shown in FIG. 5, to move the ejector pin 50 in a direction to eject the hand insert 24 away from the "B" side die 33. The hand insert 24 lifts against the flange 3 of the active device mount 1, and both the hand insert 24 and the active device mount 1 are removed from the "B" side core pin retainer 34 that remains stationary with the "B" side die. Thereby, the solidified material 16 in the tunnel gates 41, FIG. 6, is sheared, leaving mold vestiges 54, FIGS. 2 and 3, joined to the lip 17. As shown in FIGS. 2 and 3, the lip 17 has the exterior mold vestiges 54 where the material 16 in the gates 41 have been sheared. The lip 17 has an exterior 55 that is chamfered or tapered, thus, recessing the mold vestiges 54 from the advantageously smooth outer profile of the socket 11.

The larger diameter profile of the tapered lip 17 is flush with the outer profile of the front end of the socket 11.

The lip 17 has a tapered, funnel entry 56 for the socket 11. The material 16 covering the funnel entry 56 and the interior of the socket 11 is devoid of mold vestiges that otherwise would inhibit alignment of the holder 15. The material 16 covering the interior of the socket 11 has sufficiently accurate dimensions to align the holder 15. These dimensions are attained by machining smooth surfaces on the core pins 29, 33 against which the molten material 16 is formed.

The surface of the funnel entry 56 is convergent curved, rather than right conical, to eliminate intersections of one surface with another that would cause undesired corner edges at such intersections.

Figure 7:
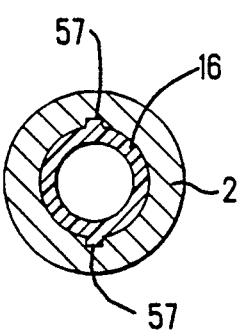
FIG. 7 is a section view taken along line 7—7 of FIG. 1.

The interior of the socket 11 is provided with grooves 57, FIG. 7, into which the material 16 flows. The material 16 conforms to the grooves and is prevented from rotation relative to the socket 11. Thus, the socket 11 is provided with means in the form of at least one groove to prevent the relative rotation. Other means, such as a flat, recessed surface or a noncircular interior of the socket 11 can prevent the relative rotation.

We claim:

1. An active device mount, comprising: a body for receiving an optoelectronic device and having a socket for receiving a holder for an optical fiber, an interior and an entrance end of the socket being covered with a material resisting deformation by receipt of the holder in the socket, the material being molded with a lip projecting from the entrance end, the lip having exterior mold vestige, the material covering the interior being devoid of mold vestige, and the material preventing a stain from being applied on the holder by the socket.

2. An active device mount as recited in claim 1, and further comprising: an interior wall within the body, and an opening in the wall.

3. An active device mount as recited in claim 1, and further comprising: a shoulder in the body, and the material being restrained from movement by conforming to the surface of the shoulder.

4. An active device mount as recited in claim 1, and further comprising: spaced apart shoulders of the body, and the material being restrained from movement by conforming to the shoulders.

5. An active device mount as recited in claim 1, and further comprising: the lip having a tapered exterior recessing the mold vestige within an outer profile of the socket.

6. An active device mount as recited in claim 1, and further comprising: the lip having an exterior flush with an outer profile of a front end of the socket, and a stepped exterior of the body being spaced from the front end of the socket.

7. An active device mount as recited in claim 1, comprising: means on the socket preventing relative rotation between the material and the socket.

8. A method for molding an active device mount, comprising the steps of: holding an alignment body of an active device mount within molding dies of a molding apparatus, the body having a socket for receiving a holder of an optical fiber in alignment with an optoelectronic device, inserting a first core pin in the body, inserting a second core pin in the body, forming molten material into a space between the second core pin and the body, and forming molten material between the second core pin and an open end of the socket to form a lip covering the open end of the socket.

9. A method as recited in claim 8, comprising the step of: forming molten material around the core pins with the core pins engaged to form an aperture through the material.

10. A method as recited in claim 8, and further including the step of: providing gates in the mold dies to an exterior of the lip to form mold gate vestiges on said exterior, and not on an interior of the receptacle.

* * * * *